Figure 1:
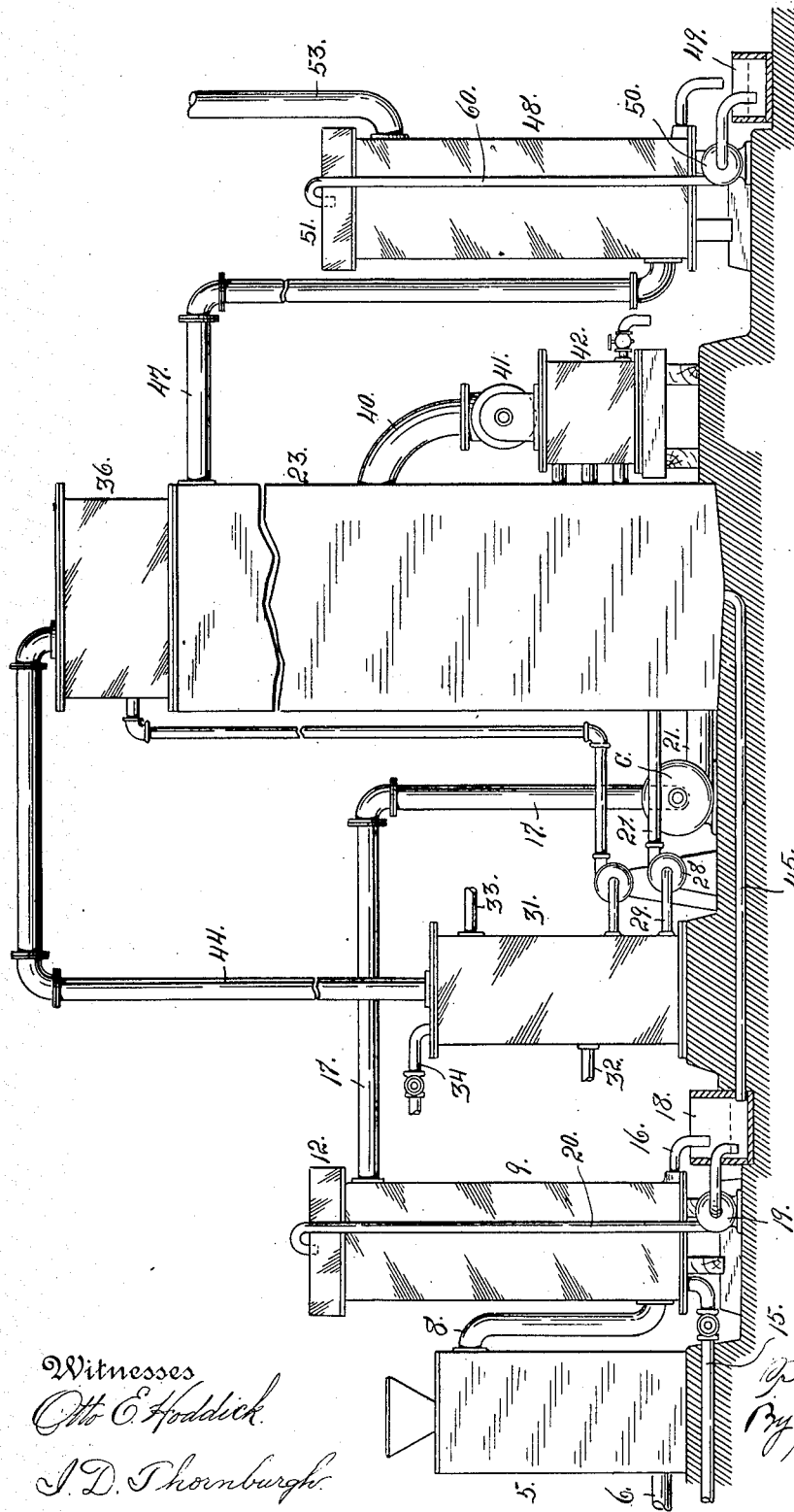

P. DANCKWARDT.
PROCESS OF PURIFYING SMELTER GASES.
APPLICATION FILED APR. 14, 1908.

918,424.

Patented Apr. 13, 1909.

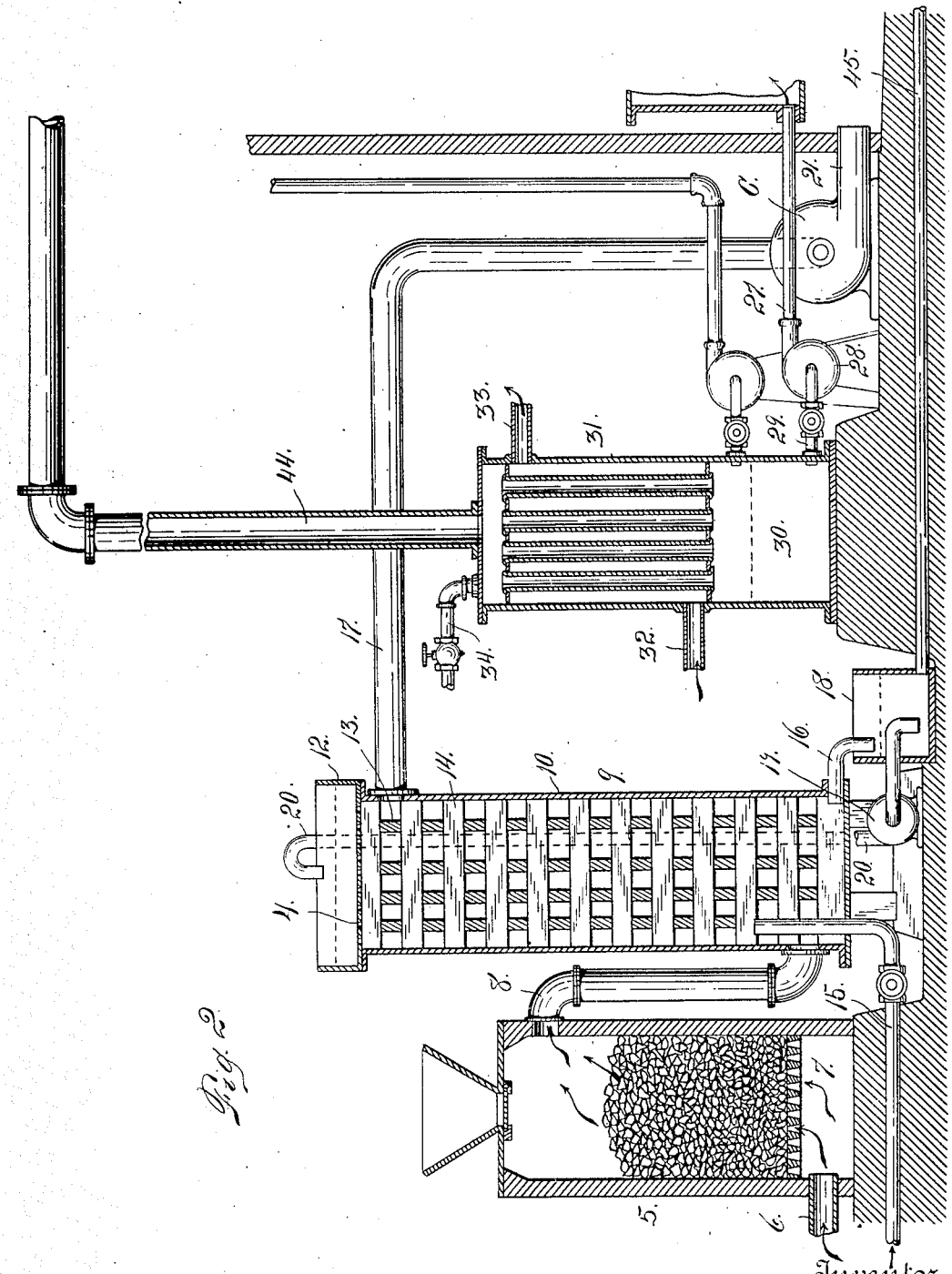

P. DANCKWARDT.
PROCESS OF PURIFYING SMELTER GASES.
APPLICATION FILED APR. 14, 1908.
918,424.
Patented Apr. 13, 1909.
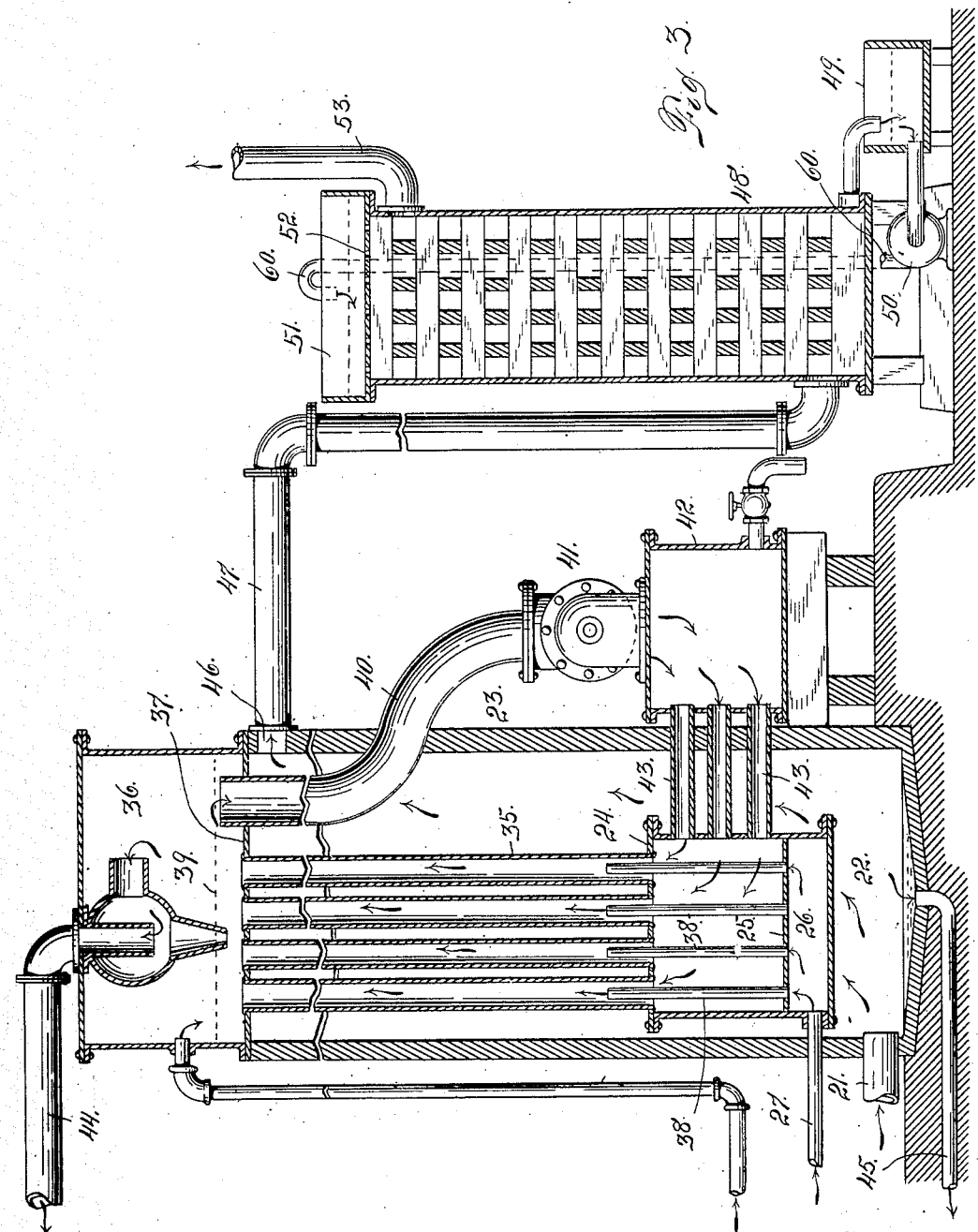

UNITED STATES PATENT OFFICE.

PAUL DANCKWARDT, OF DENVER, COLORADO.

PROCESS OF PURIFYING SMELTER-GASES.

No. 918,424.      Specification of Letters Patent.      Patented April 13, 1909.

Application filed April 14, 1908. Serial No. 426,977.

*To all whom it may concern:*

Be it known that I, PAUL DANCKWARDT, a citizen of the United States, residing in the city and county of Denver and State of Colorado, have invented a certain new and useful Process of Purifying Smelter-Gases; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a process of condensing smelter fumes. The destructiveness of these fumes has been felt severely all over the country for a number of years. The principal objectionable ingredients of these fumes being the sulfurous and sulfuric acid, several attempts have been made to eliminate these compounds from the gases by converting them into commercial sulfuric acid, but the gases being very dilute and there being an insufficient market for the product in the localities where the smelters are located, these attempts have not been successful.

My present invention consists in a process by which I convert the sulfur compounds into elemental sulfur, which may be shipped to any place and by which the other compounds are turned into a mixture of gases adapted for heating purposes or for use in gas engines. At the same time I extract the largest part of the heat contained in the gases, by passing them through an apparatus which produces power in a novel way, the particular process and apparatus for this purpose forming the subject matter of contemporaneous applications, the said applications having been filed April 14, 1908, and numbered 426978 and 426976 respectively.

I do not claim any particular apparatus in which the reactions of this process may be made to take place, except that part of it which serves mainly for the conversion of the heat of the gases into useful mechanical work, which is covered by one of the separate applications heretofore referred to.

The accompanying drawing illustrates one form of apparatus suited for carrying out the process though it is evident that many other specific constructions may be employed.

In this drawing, Figure 1 is an elevation showing the entire apparatus. Fig. 2 is a vertical section taken through a portion of the same shown on a larger scale. Fig. 3 is a similar section illustrating the portion of the apparatus broken away from Fig. 2.

The same reference characters indicate the same parts in all the views.

Let the numeral 5 designate a gas producer of any type, the same having an inlet pipe 6 connected with the flue dust chamber of a smelter (not shown) and also with a source (not shown) of steam supply.

The numeral 7 designates the ashpit of the producer. This producer has an outlet pipe 8 whose lower extremity is connected with the lower portion of a precipitating tower 9, composed of a shell or casing 10 provided with a pan 12 at the top which forms a cover. The bottom of this pan is perforated as at 4 to allow a spray of solution to fall over the slabs or cross bars 13 and 14 located inside the casing, the two sets of bars being arranged one above another and extending at right angles to each other, each set being sufficiently separated to allow the solution to pass downwardly therethrough. Leading into this tower or scrubber, is a pipe 15 which is connected directly with the flue dust chamber of the smelter and by means of which the raw fumes are carried to the scrubber.

16 is an outlet pipe for the solution, connected with the bottom of the tower 9, and 17 an outlet pipe for the gases. Below the outlet pipe 16 is a tank 18 with which a pump 19 is connected. This pump serves to remove the liquid from the tank 18 and transfer it through a pipe 20, to the pan 12 at the top of the tower.

C is a fan blower which draws the gases from the precipitating tower and introduces them by way of a pipe 21, into the bottom 22 of a casing 23 in the lower portion of which is located a box 24 having a false bottom 25 which separates a lower compartment 26 from the body of the box. Into this compartment 26 a gas producing medium as carbon disulfid, is introduced through a pipe 27 by means of a pump 28 connected by a pipe 29 with the lower part 30 of a pipe condenser 31 having an inlet 32 and an outlet 33 for the cooling water. The carbon disulfid or other suitable gas-producing medium is introduced to the condenser through a pipe 34. A series of pipes 35 is located within the casing 23, the said pipes being open ended, their lower extremities communicating with the box 24 and their upper extremities with a chamber 36 mounted on top of the casing 23, the bottom 37 of the said chamber closing the top of the casing. The upper and lower extremities of the pipes 35 are fitted tightly into the bottom 37 of the chamber 36 and the top of the box or chamber 24, respectively. A number of pipes 38 extend upwardly through the box 24, the said pipes being open ended, their lower extremities communicating with the compartment 26 and their upper extremities protruding into the pipes 35, the pipes 38 being considerably smaller than the pipes 35. The lower extremities of the pipes 38 are fitted closely into openings formed in the false bottom 25 of the box 24. The box 24, the pipes 35 and the lower part of the chamber 36, contain a circulating fluid preferably water, the level of this fluid being indicated by the dotted line 39 in the chamber 36. The gases introduced into the bottom 22 of the casing 23, heat the water or other circulating fluid contained in the elements just mentioned, to a temperature below the boiling point. The gas-producing medium delivered to the compartment 26 through the pipe 27, is volatilized by coming in contact with the heated water, since it boils or volatilizes at a lower temperature than the water. The result is that the solution is set into motion and passing upwardly through the pipes 35, into the chamber 36, overflows into a conduit 40 and passes downwardly to a turbine motor 41 whence it passes into a box 42 and thence back through pipes 43 into the box 24 whereby its circulation is continued. The gas resulting from the volatilization of the bisulfid of carbon or other gas-producing medium, passes upwardly into the chamber 36 and thence through a pipe 44 back into the condenser 31 and after being condensed therein, is returned again to the circulating-fluid tank where it performs the function just described. Any water carried over with the gases from the tower 9 and delivered through the agency of the pump C to the casing 23, is condensed within the latter and returned by way of a pipe 45 to the tank 18, while the gases escaping from the casing 23 after having served to heat the circulating medium, pass out of the casing through a port 46, into a conduit 47 whence they pass to the bottom of a precipitating or absorption tower 48 which is of the same construction as the tower 9 heretofore described and has a collecting tank 49 and a pump 50 from which the liquid is taken from the tank 49 and carried through a pipe 60, to the top of the tower 48 and discharged into an upper tank 51 and passes thence through the perforated bottom 52 of the tank 51 downwardly into the tower and through the checker work contained therein. In this tower the gas is purified by the removal of the balance of its objectionable elements such as the remaining hydrogen sulfid and ammonia, the purified gas finally passing out of the tower through a pipe 53.

In order to carry out my process in this apparatus, I first start the blower C, which is to draw the gases from the flue dust chamber of the smelter as is commonly used in smelting works, where most of the solid suspended particles are withheld, together with a sufficient amount of steam, through the producer 5 and through the precipitating tower 9. After passing through the blower, these gases are driven into the casing 23 where they are utilized to heat a circulating medium as heretofore explained and after performing the heating function therein, pass through the conduit 47 into the condensing or absorption tower or apparatus 48, from which they are led to any place where they may be intended to be used. I now start the pumps 19 and 50, which provide for the proper circulation of the solutions to be used in both of the towers 9 and 48. When the water within the circulating tank composed of the elements 24, 35 and 36, is put into circulation in the manner heretofore explained, it passes through the conduit 40 and operates the turbine 41.

The chemical reactions effected in the various parts of the system in carrying out my improved process are as follows: In the producer 5, the mixture of flue gases and steam will leave part of their metallic fumes which will be recovered with the ashes and can be returned to the furnaces. At the same time the glowing carbon with which the producer is filled, reacts with the carbonic acid, reducing this to carbon monoxid according to the formula: $CO_2 + C = 2CO$, while the steam and the sulfurous acid react with the glowing carbon in such a way as to form hydrogen sulfid and carbon monoxid:

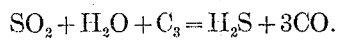
$$SO_2 + H_2O + C_3 = H_2S + 3CO.$$

It may be stated that it is not necessary to run the gases so slowly as to make this reaction complete, because a certain amount of sulfurous acid ought to be left undecomposed in the precipitating tower 9. The hot gases on entering this precipitating tower, ought to be mixed with unaltered flue gas as drawn in through the tube 15, in such a proportion that a slight excess of hydrogen sulfid exists over the amount needed for the reaction that is to take place here. In order to make this reaction perfect, the temperature of the gas mixture has to be reduced considerably, which result is obtained by making it meet a strong shower of solution. This will create a large amount of steam. The solution I use in the precipitating tower is that of any neutral salt which will not react with the $H_2S$ or $SO_2$ directly, such as calcium chlorid. If the $SO_2$ and $H_2S$ are correctly proportioned, which is determined by a test on the escaping gas mixture, the following reaction will take place:

$$SO_2 + 2H_2S = 2H_2O + 3S.$$

The sulfur set free will settle at the bottom of tank 18, together with small amounts of dust and metallic fumes, and is withdrawn therefrom at certain intervals for further treatment in any of the known ways for the recovery of the sulfur. The test for $H_2S$ on the escaping gases ought to show a slight excess of $H_2S$ and no $SO_2$. The gas mixture passes now into the hot water turbine apparatus, where a large part of its heat is given off and transformed into power by putting the circulating medium in the elements 24, 35 and 36, into motion, while the water from the condensed steam returns through the pipe 45 to the tank 18, where it mixes again with the salt solution to begin its cycle anew. The gas mixture which contains now only small amounts of hydrogen sulfid and perhaps some ammonia and other nitrogenous substances, passes on through the conduit 47 to the absorption tower 48 where it is brought into contact with the solution of iron salt, the object of which is to form iron sulfid and ammonium sulfate with the last traces of hydrogen sulfid and the ammonia. When leaving this apparatus, the gas is ready for use in any way.

Having thus described my invention, what I claim is:

1. The process of eliminating the destructive ingredients from smelter gases, which consists in passing the gases together with steam through a body of glowing carbon, and mixing the resulting gases with further quantities of the original gas-containing sulfur dioxid, after which the gases are brought in contact with a solution containing some metallic salt which will not react with the gases, cooled, and again washed with a solution of an iron salt.

2. The process of eliminating the destructive ingredients from smelter gases, which consists in mixing the gases with steam, bringing the mixture in contact with glowing carbon to reduce the $SO_2$ to $H_2S$ and the $CO_2$ to CO, and then mixing the gases with further quantities of the raw gas and a solution containing some metallic salt which will not react with the gases to reduce the sulfur compounds to the elemental state, cooling the gases, and finally treating them with a solution of an iron salt.

3. The process of eliminating the destructive ingredients from smelter gases, which consists in reducing the sulfur compounds by contact with steam and glowing carbon, and then reducing the resulting compounds to the elemental state by bringing them in contact with further quantities of the original gas, water and a metallic salt which will not react with the gases, condensing the steam formed, and finally washing the gases by a solution of an iron salt.

4. The process of eliminating the destructive ingredients from smelter gases, which consists in transforming the sulfurous acid of the gases into hydrogen sulfid by contact with steam and glowing carbon, and mixing the gases with another quantity of raw gas and reducing the hydrogen sulfid and the sulfurous acid to the elemental state by contact with a solution containing a metallic salt, which will not react with the gases, cooling, and taking out any excess of hydrogen sulfid and nitrogenous compounds by bringing the gas mixture in contact with the solution of an iron salt.

In testimony whereof I affix my signature in presence of two witnesses.

PAUL DANCKWARDT.

Witnesses:
DENA NELSON,
A. J. O'BRIEN.